US012348936B2

(12) United States Patent
Nielsen et al.

(10) Patent No.: US 12,348,936 B2
(45) Date of Patent: Jul. 1, 2025

(54) METHOD OF OPERATING AN IN-SITU FITTING SYSTEM AND AN IN-SITU FITTING SYSTEM

(71) Applicant: WIDEX A/S, Lynge (DK)

(72) Inventors: Jens Brehm Bagger Nielsen, Ballerup (DK); Lasse Lohilahti Moelgaard, Bagsvaerd (DK)

(73) Assignee: WIDEX A/S, Lynge (DK)

( * ) Notice: Subject to any disclaimer, the term of this patent is extended or adjusted under 35 U.S.C. 154(b) by 405 days.

(21) Appl. No.: 17/785,995

(22) PCT Filed: Jan. 21, 2021

(86) PCT No.: PCT/EP2021/051337
§ 371 (c)(1),
(2) Date: Jun. 16, 2022

(87) PCT Pub. No.: WO2021/148538
PCT Pub. Date: Jul. 29, 2021

(65) Prior Publication Data

US 2023/0024080 A1 Jan. 26, 2023

(30) Foreign Application Priority Data

Jan. 22, 2020 (DK) ............................ PA202000075

(51) Int. Cl.
*H04R 25/00* (2006.01)

(52) U.S. Cl.
CPC ......... *H04R 25/70* (2013.01); *H04R 2225/55* (2013.01)

(58) Field of Classification Search
CPC ............................ H04R 25/70; H04R 2225/55
USPC .......................................................... 381/314
See application file for complete search history.

(56) References Cited

U.S. PATENT DOCUMENTS

| | | | |
|---|---|---|---|
| 2012/0183164 | A1 | 7/2012 | Foo et al. |
| 2018/0242090 | A1 | 8/2018 | Sigwanz et al. |

FOREIGN PATENT DOCUMENTS

| | | | |
|---|---|---|---|
| EP | 1 946 609 | B1 | 5/2010 |
| EP | 2952020 | A1 | 12/2015 |
| EP | 3 107 314 | A1 | 12/2016 |
| EP | 3 267 695 | A1 | 1/2018 |
| EP | 3 468 227 | A1 | 4/2019 |
| WO | 2016/004983 | A1 | 1/2016 |

OTHER PUBLICATIONS

1st technical examination of PA 2020 00075 dated Aug. 18, 2020 [PCT/ISA/210].
International Search Report of PCT/EP2021/051337 dated Mar. 10, 2021 [PCT/ISA/210].
Written Opinion of PCT/EP2021/051337 dated Mar. 10, 2021 [PCT/ISA/237].
Marius Kaminskas et al., "Contextual music information retrieval and recommendation: State of the art and challenges", Computer Science Review, 2012, vol. 6, pp. 89-119 (31 pages).
Communication dated Nov. 12, 2024, issued in European Application No. 21 701 506.4.

*Primary Examiner* — Sean H Nguyen
(74) *Attorney, Agent, or Firm* — Sughrue Mion, PLLC

(57) ABSTRACT

A method of operating an in-situ fitting system (100) adapted to suggest an improved hearing aid parameter setting for a current user based on evaluated hearing aid parameter settings from a plurality of other users. The invention is also directed at an in-situ fitting system adapted to carry out said method.

17 Claims, 2 Drawing Sheets

METHOD OF OPERATING AN IN-SITU FITTING SYSTEM AND AN IN-SITU FITTING SYSTEM

CROSS REFERENCE TO RELATED APPLICATIONS

This application is a National Stage of International Application No. PCT/EP2021/051337, filed Jan. 21, 2021, claiming priority to Danish Patent Application No. PA202000075, filed Jan. 22, 2020.

The present invention relates to a method of operating an in-situ fitting system. The invention also relates to an in-situ fitting system.

BACKGROUND OF THE INVENTION

Within the context of the present disclosure a hearing aid can be understood as a small, battery-powered, microelectronic device designed to be worn behind or in the human ear by a hearing-impaired user. Prior to use, the hearing aid is adjusted by a hearing aid fitter according to a prescription. The prescription is based on a hearing test, resulting in a so-called audiogram, of the performance of the hearing-impaired user's unaided hearing. The prescription is developed to reach a setting where the hearing aid will alleviate a hearing loss by amplifying sound at frequencies in those parts of the audible frequency range where the user suffers a hearing deficit. A hearing aid comprises one or more microphones, a battery, a microelectronic circuit comprising a signal processor adapted to provide amplification in those parts of the audible frequency range where the user suffers a hearing deficit, and an acoustic output transducer. The signal processor is preferably a digital signal processor. The hearing aid is enclosed in a casing suitable for fitting behind or in a human ear.

Within the present context a hearing aid system may comprise a single hearing aid (a so called monaural hearing aid system) or comprise two hearing aids, one for each ear of the hearing aid user (a so called binaural hearing aid system). Furthermore, the hearing aid system may comprise an external device, such as a smart phone having software applications adapted to interact with other devices of the hearing aid system. Thus, within the present context the term "hearing aid system device" may denote a hearing aid or an external device.

Generally a hearing aid system according to the invention is understood as meaning any system which provides an output signal that can be perceived as an acoustic signal by a user or contributes to providing such an output signal and which has means which are used to compensate for an individual hearing loss of the user or contribute to compensating for the hearing loss of the user. These systems may comprise hearing aids which can be worn on the body or on the head, in particular on or in the ear, and can be fully or partially implanted. However, some devices whose main aim is not to compensate for a hearing loss may nevertheless be considered a hearing aid system, for example consumer electronic devices (televisions, hi-fi systems, mobile phones, MP3 players etc.) provided they have measures for compensating for an individual hearing loss.

It is well known within the art of hearing aid systems that most users will benefit from a hearing aid programming (this process may also be denoted fitting) that takes the user's personal preferences into account. This type of fine tuning or optimization of the hearing aid system settings may be denoted personalization or using a more generic term it may be denoted a machine learning procedure. However, it is well known that the process of personalization is a very challenging one.

One problem with personalization is that it may be very difficult for a user to explain in words what types of signal processing and the resulting sounds that are preferred.

Personalization may generally be advantageous with respect to basically all the various types of signal processing that are carried out in a hearing aid system. Thus, personalization may be relevant for e.g. noise reduction, sound customization, speech enhancement as well as for classification of the sound environment.

EP-B1-1946609 discloses a method for optimization of hearing aid parameters. The method is based on Bayesian incremental preference elicitation whereby at least one signal processing parameter is adjusted in response to a user adjustment. According to a specific embodiment the user adjustment is simply an indication of user dissent.

EP-B1-1946609 is complicated in so far that it applies a parameterized approach in order to model the user's unknown internal response function (i.e. the user's preference), because it is very difficult to find a suitable parameterized model that suits the great variety of hearing aid system users unknown internal response functions.

Furthermore EP-B1-1946609 is complicated because the processing and memory requirements are very high, especially for hearing aid systems that generally have limited processing and memory resources.

One advanced method for optimizing hearing aid parameters includes interaction between a hearing aid system and an internet server. The advantage of such methods are the abundant processing resources available in the internet server and the suitability of internet servers to receive data from a plurality of hearing aid systems (and their users) and provide some form of processed data back to said plurality of hearing aid systems. As one example, a new hearing aid system setting that is determined in order to improve hearing aid system performance for a given user is one form of such processed data.

In the following systems capable of carrying out such methods may in the following be denoted an in-situ fitting system, thus this terminology simply represents a system comprising at least one internet server that is adapted to optimize the setting of at least one hearing aid system parameter and link means adapted to provide at least an operational connection between the internet server and the hearing aid system.

It is therefore a feature of the present invention to provide an improved method of operating an in-situ fitting system with respect to at least ease of use, time spent by the user and the general user satisfaction.

It is another feature of the present invention to provide an in-situ fitting system with such improved means for optimizing a hearing aid system setting.

Additionally, the inventor has found that internally generated sounds that are used for providing comfort, be it for masking undesired sounds or for causing a relaxing experience, may benefit significantly from personalization.

In the context of the present disclosure, a relaxing sound should be understood as a sound having a quality whereby it is easy to relax and be relieved of e.g. stress and anxiety when subjected to it. Traditional music is one example of relaxing sound while noise is most often used to refer to a sound that is not relaxing.

In the context of the present disclosure, a relaxing sound may especially be understood as a sound adapted for relieving tinnitus.

However, in the present context, internally generated sounds may also be used for other purposes than providing comfort.

SUMMARY OF THE INVENTION

The invention, in a first aspect, provides a method of operating an in-situ fitting system according to claim 1.

This provides an improved method of operating an in-situ fitting system in order to adapt the hearing aid system to a user's preference.

The invention, in a second aspect, provides an in-situ fitting system according to claim 8.

This provides an improved in-situ fitting system with respect to user personalization and hearing aid parameter optimization.

Further advantageous features appear from the dependent claims.

Still other features of the present invention will become apparent to those skilled in the art from the following description wherein the invention will be explained in greater detail.

BRIEF DESCRIPTION OF THE DRAWINGS

By way of example, there is shown and described a preferred embodiment of this invention. As will be realized, the invention is capable of other embodiments, and its several details are capable of modification in various, obvious aspects all without departing from the invention. Accordingly, the drawings and descriptions will be regarded as illustrative in nature and not as restrictive. In the drawings.

DETAILED DESCRIPTION

According to an aspect of the invention it has been found that it provides a significant improvement for the user if the hearing aid system settings can be adapted to the user's current preferences (i.e. personalized). This is even more so because the user's preferences may vary significantly up to several times during a day, as a function of e.g. the time of day (morning, afternoon or evening) or the user's mood or the type of activity the user is engaged in.

As a consequence of these varying preferences of many users it provides a significant improvement for the user if the personalization can be carried out without having to spend too much time optimizing the settings.

Furthermore, it has been found that it is of significant importance that the personalization (i.e. the optimization of a hearing aid parameter setting) can be carried out without requiring the user to interact with the hearing aid system in a complex manner.

Figure 1:
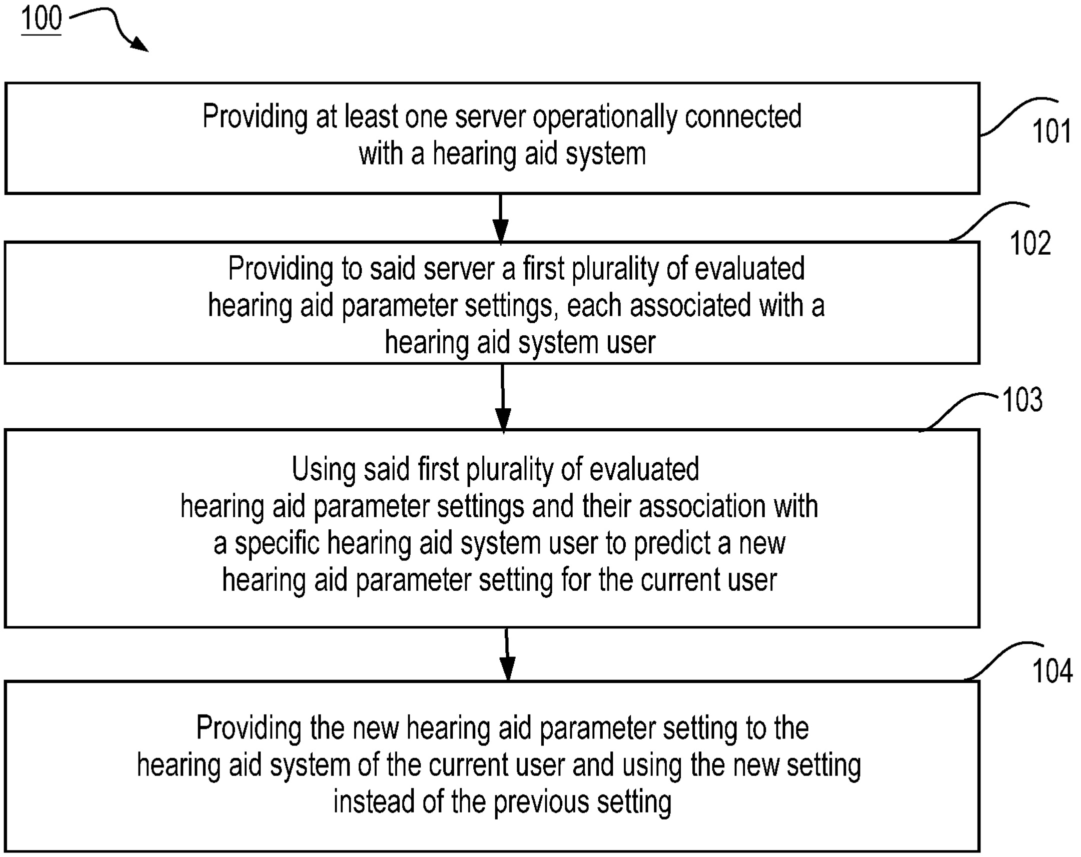
FIG. 1 illustrates highly schematically a method of operating an in-situ fitting system according to an embodiment of the invention.

Reference is first made to FIG. 1 which illustrates highly schematically a method 100 of operating an in-situ fitting system according to a first embodiment of the invention.

According to the present embodiment the method is adapted for a adjusting a first hearing aid parameter setting of a hearing aid system in response to a trigger event indicating that the first hearing aid parameter setting is not satisfactory.

According to variations of the present embodiment the trigger event is selected from a group comprising: activating of a hearing aid system handle adapted to provide an indication that the current hearing aid parameter setting is not satisfactory, and detection that the cognitive stress experienced by the hearing aid system user is above a given threshold. According to more specific embodiment the handle is a button accommodated in a hearing aid of the hearing aid system or a handle implemented in a GUI of an external device, typically a smart phone, of the hearing aid system.

According to a first step 101 at least one server, operationally connected with the hearing aid system, is provided.

In variations a hearing aid or an external device of the hearing aid system is connected directly to the server using a wireless link to the internet, based on e.g. the 3G, 4G or upcoming 5G broadband cellular network technology. Alternatively, an external device such as a smart phone of the hearing aid system may be used as gateway for the hearing aid, all of which will be well known for the skilled person.

According to a second step 102 a first plurality of evaluated hearing aid parameter settings, each associated with a specific hearing aid system user, are provided to said at least one server.

Thus, in the present context a hearing aid parameter setting represents a set of selected values one for each of a corresponding set of parameters. According to a variation, the provided hearing aid parameter settings only represents a sub-set of all the parameters required to operate the hearing aid system.

According to a specific advantage of the present invention, the parameters, whose selected (i.e. preferred) values are provided to said at least one server, have been carefully selected due to their ability to represent general trends for all hearing aid system users. One example of such a set of parameters is a set of fine-tuning gains to be added or subtracted in a corresponding set of frequency bands. In more specific variations the number of frequency bands is three or four. However, more frequency bands such as between 10 and 20 may also be considered dependent primarily of the available processing power.

Basically, any type of hearing aid parameter is suitable for being adjusted in accordance with this method, thus e.g. noise reduction algorithms, beam forming algorithms, and compressor settings may be improved.

According to a more specific embodiment an evaluated hearing aid parameter setting may be obtained using the optimization method disclosed in WO-A1-2016004983 with the title "Method of optimizing parameters in a hearing aid system and a hearing aid system" and by the same applicant and which is hereby incorporated by reference. More specifically reference may be given to page 20, lines 15-27, which describes criteria for considering a hearing aid parameter setting to be preferred and therefore to be stored in a hearing aid. However, according to another specific variation, a hearing aid parameter setting may be considered evaluated already if the predicted internal response function (that may also be denoted the preference function) for a given hearing aid parameter setting is estimated with sufficient precision by said optimization method.

It is emphasized though that the present invention is generally independent on the specific method used to provide evaluated hearing aid parameter settings. More specifically the present invention is independent on whether said specific method to provide evaluated hearing aid parameter settings is probabilistic or not and independent on whether said specific method is parameterized or not.

According to yet another variation a hearing aid parameter setting is considered to have been evaluated if it fulfils at least one of: the setting has been stored in the hearing aid system, the setting has been rated in an in-situ comparison between two different hearing aid parameter settings and the value of a user's internal response function for the hearing aid parameter setting has been estimated with sufficient precision.

According to a third step 103 said first plurality of evaluated hearing aid parameter settings and their association with a specific hearing aid system user is used to predict a new hearing aid parameter setting adapted to replace said first hearing aid parameter setting for the current user.

Consider now an embodiment where a hearing aid system user wants to determine fine-tuning gains for say 3 frequency bands with a resolution of say 1 dB and an adjustment range of say +/−10 dB, which provides say 10 000 different hearing aid parameter settings that in the following for simplicity reasons may be denoted items.

Now, the connection between hearing aid system users (which in the following may simply be denoted users) and hearing aid parameter settings (i.e. items) can be represented as a matrix $$\underline{\underline{X}} = \begin{matrix} user_1 \\ user_2 \\ user_3 \end{matrix} \overset{\begin{matrix} item_1 & item_2 & item_3 & \ldots & \end{matrix}}{\begin{bmatrix} 1 & & & \ldots & \\ & 1 & 1 & \ldots & \\ 1 & 1 & & \ldots & 1 \end{bmatrix}},$$

where a value of 1 at row 1, column 1 means that $user_1$ has saved the hearing aid parameter setting represented by $item_1$ in her hearing aid system at some point in time. Hearing aid parameters settings that have not been stored in the hearing aid system of a given user will, according to this specific variation, be assigned a value of zero. According to an alternative embodiment, the values in the matrix $\underline{\underline{X}}$ (that in the following may be denoted ratings matrix) may also represent ratings in an absolute scale, which according to one example can be achieved by translating pairwise comparisons performed within a fine-tuning optimization algorithm to an absolute scale. According to a more specific example (using WO-A1-2016004983 also mentioned above) this translation can be performed by calculating the Gaussian Process mean for the pairwise evaluated settings to get scalar values, which are then interpreted as the user's rating of the hearing aid parameter setting. Therefore according to this embodiment the matrix $\underline{\underline{X}}$ will contain ratings for the hearing aid parameter settings that the user has encountered while carrying out the fine-tuning optimization and zeros for unseen settings:

$$\underline{\underline{X}} = \begin{matrix} user_1 \\ user_2 \\ user_3 \end{matrix} \overset{\begin{matrix} item_1 & item_2 & item_3 & \ldots & \end{matrix}}{\begin{bmatrix} 7.9 & & & \ldots & 4.8 \\ & 2.2 & 5 & \ldots & \\ 9.1 & 3.4 & & \ldots & 1 \end{bmatrix}},$$

Subsequently, the process of recommending a new hearing aid parameter setting to a current user can according to an embodiment be based on the nearest neighbor algorithm.

The first step of this algorithm is to measure the similarity of users based on their user preference vectors (i.e. the rows in the ratings matrix $\underline{\underline{X}}$) by determining a distance measure between the user preference vectors. According to variations the distance measure can be a Pearson correlation or cosine distance, but other distance measures may also be used. The next step is to choose the k nearest neighbors given the distance between user preference vectors. Finally, the predicted new setting (i.e. the best setting) for the current user can be determined by calculating e.g. a mean or medoid user preference vector for the k nearest neighbors and selecting as the new setting the setting that has the highest rating in the mean user preference vector.

However, the nearest neighbor algorithm may be considered disadvantageous if too many hearing aid parameter settings has not been rated, because the algorithm requires that the overlap of item ratings for each pair of users must have some minimal size. Consequently, according to another embodiment, in order to relieve this data sparsity problem matrix factorization techniques can be used. Matrix factorization algorithms work by decomposing the ratings matrix into the product of two lower dimensionality rectangular matrices, i.e.:

$$\underline{\underline{X}}_{N\times I} \approx \underline{\underline{U}}_{N\times F} \underline{\underline{V}}_{F\times I}$$

wherein the $\underline{\underline{U}}$ matrix, that in the following may be denoted user matrix, has dimensions N×F where the N matrix rows represent the number of hearing aid system users and the F matrix columns represent latent factors and wherein the $\underline{\underline{V}}$ matrix, that in the following may be denoted settings matrix, has dimensions F×I where the F matrix rows represent the selected latent factors and where the I columns represent the hearing aid parameter settings.

The number of latent factors, F, must be chosen based on the specific application, but generally the latent factors provide a representation of the hearing aid parameter setting ratings of all considered users.

Given the two lower dimensionality matrices a rating for any given hearing aid parameter setting, even a previously un-evaluated setting for a user (such as the current user) can therefore be estimated as:

$$\hat{x}_{n,i} = \sum_{f=0}^{F} u_{n,f} v_{f,i}$$

According to a more specific embodiment the matrix decomposition is carried out using non-negative matrix factorization, which requires that all the elements of both the ratings matrix and said two lower dimensionality matrices are non-negative.

According to a fourth step 104 the new hearing aid parameter setting is provided to the hearing aid system and used instead of the previous (i.e. the first) hearing aid parameter setting.

According to a variation of the present embodiment the method is adapted to additionally prompt the current user to evaluate said new hearing aid parameter setting and providing said evaluation to said at least one server. The evaluation may comprise an acceptance or rejection of the new setting or a comparison of the new setting with the previous setting.

This variation is especially advantageous because it provides that the disclosed methods used to predict a new hearing aid parameter setting receives feedback that can be used to improve performance. According to a specific variation this is achieved by carrying out a matrix factorization with the new data. According to another even more specific variation the difference between the estimated rating of the new setting and the user's actual evaluation determines whether the model behind the method of predicting a new setting needs to be updated, as one example by carrying out the matrix factorization with the new data.

According to another variation of the present embodiment the method is adapted to provide, to said at least one server, a plurality of additional data, each associated with a specific hearing aid system user, representing at least one characteristic selected from a group comprising age, gender, race, audiogram, type of hearing aid system worn, experience with wearing a hearing aid, native language and country of residence, and using said additional data to contribute to predicting a new hearing aid parameter setting by adding the plurality of additional data to the first plurality of evaluated hearing aid parameter settings. Hereby improved prediction may be achieved especially for a new hearing aid system user that have not yet evaluated any or only few hearing aid parameter settings.

According to a more specific variation a function capable of providing a new row (i.e. a new hearing aid system user) in the user matrix as a function of the associated additional data may be derived using the additional data for the other hearing aid system users. According to an even more specific variation said new row may be provided based on cluster analysis.

According to yet another embodiment improved predictions of a new best setting for a specific situation may be achieved by only considering hearing aid parameter settings that have been associated with said situation, wherein said situation is selected from a group of situations comprising an identified sound environment, an identified geographical location and a specific cognitive state of the hearing aid system user. According to another embodiment data representing at least one of said specific situations is associated with a corresponding hearing aid parameter setting and incorporated in the items used to construct the ratings matrix, such that each item no longer consists only of hearing aid parameter settings but also includes information identifying a specific situation. This embodiment is particularly advantageous because it enables the use of Matrix factorization methods to predict a preferred hearing aid parameter setting for a specific situation that a current user experiences for the first time.

Figure 2:
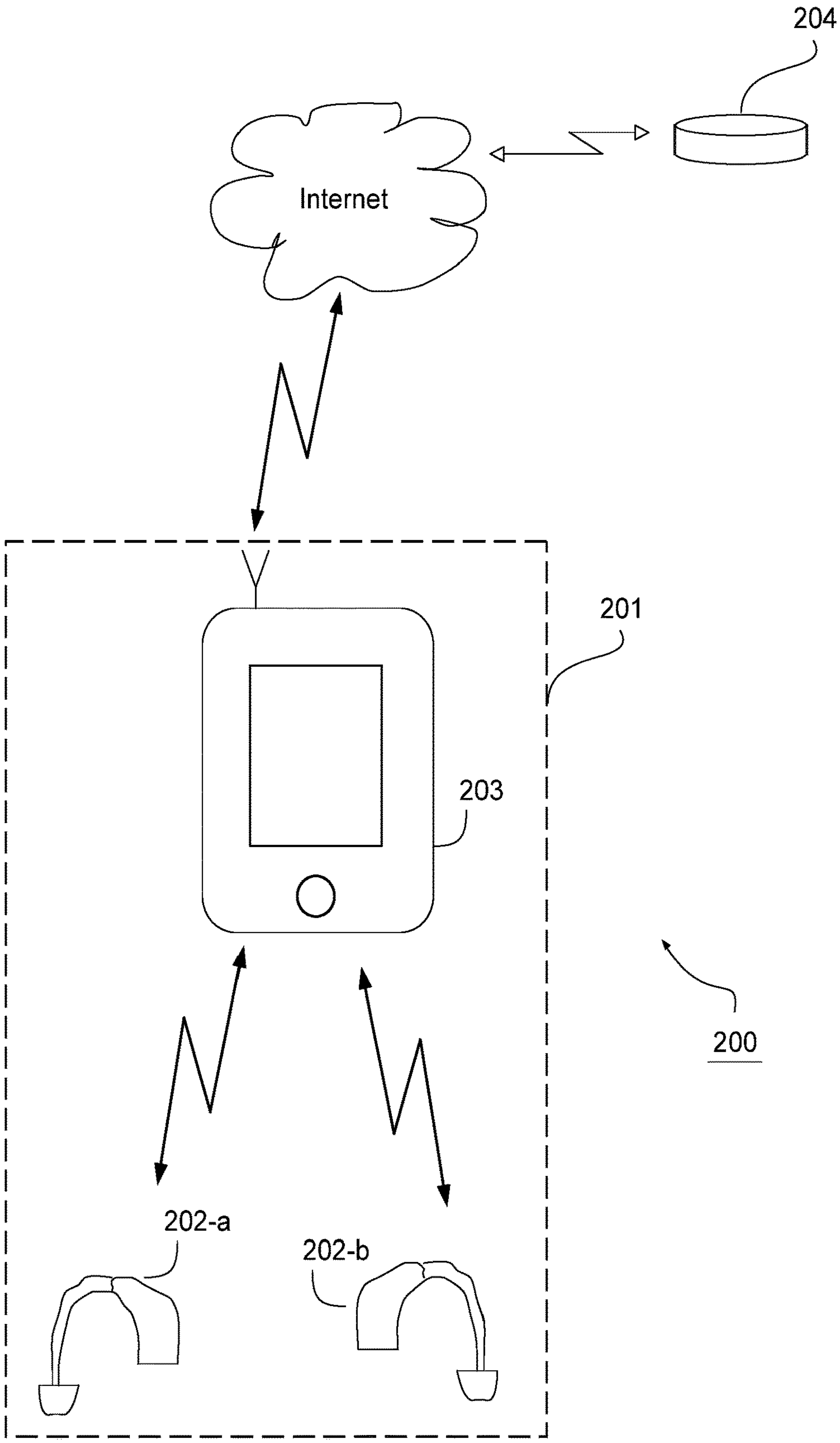
FIG. 2 illustrates highly schematically an in-situ fitting system according to an embodiment of the invention.

Reference is now made to FIG. 2, which illustrates highly schematically an in-situ fitting system 200 according to a second embodiment of the invention.

The in-situ fitting system 200 comprises a hearing aid system 201 consisting of a left hearing aid 202-*a* and a right hearing aid 202-*b* and an external device, e.g. in the form of a smart phone 203 with a specific software application installed. Furthermore the in-situ fitting system 200 comprises an internet server 204 that is adapted to receive, over the internet, a plurality of evaluated hearing aid parameter settings, and adapted to transmit a new hearing aid parameter setting to said hearing aid system 201 in response to a trigger event.

In obvious variations the hearing aid system may consist of a single hearing aid (a so called monaural fitting) or may consist of both a left and a right hearing aid (a so called binaural fitting) and furthermore the hearing aid system may (or may not) include an external device 203.

According to another embodiment the in-situ fitting system does not comprise the hearing aids 202-*a* and 202-*b*, instead the in-situ fitting system is operationally connected with the hearing aids 202-*a* and 202-*b* either directly from the internet server or through the external device 203 that may operate as a gateway.

It is noted that the present invention does not require neither the use of probabilistic methods nor non-parameterized methods to provide evaluated hearing aid parameter settings, although these methods are generally preferred because they are more efficient than the alternative methods.

It is likewise noted that the present invention is independent on whether the parameters to be optimized are used to control how sound is processed in the hearing aid system or whether they are used to control how sound is synthetically generated by the hearing aid system.

The present invention is also independent on how the hearing aid system parameters are provided or offered or selected for optimization.

Generally, disclosed variations may be combined with all other disclosed variations unless the opposite is specifically mentioned.

The invention claimed is:

1. A method of operating an in-situ fitting system adapted for adjusting a hearing aid parameter setting of a hearing aid system in response to a trigger event indicating that a first hearing aid parameter setting is not satisfactory, wherein adjustment of the first hearing aid parameter setting for a current user is carried out through the steps of:

providing at least one server operationally connected with said hearing aid system;

providing to said at least one server a first plurality of evaluated hearing aid parameter settings each associated with a specific hearing aid system user;

using said first plurality of evaluated hearing aid parameter settings and their association with a specific hearing aid system user to predict a new hearing aid parameter setting adapted to replace said first hearing aid parameter setting for the current user, and providing the new hearing aid parameter setting to the hearing aid system and replacing said first hearing aid parameter setting with said new hearing aid parameter setting; and wherein the step of using said first plurality of evaluated hearing aid parameter settings and their association with a specific hearing aid system user to predict a new hearing aid parameter setting adapted to replace said first hearing aid parameter setting for the current user comprises the further steps of:

providing a ratings matrix representing said first plurality of evaluated hearing aid parameter settings each associated with a specific hearing aid system user;

decomposing the ratings matrix into the product of two lower dimensionality matrices, predicting the new hearing aid parameter setting by at least partly multiplying said two lower dimensionality matrices in order to determine a vector representing the estimated ratings of the hearing aid parameter settings, for the current user and selecting the hearing aid parameter setting with the highest estimated rating as the new hearing aid parameter setting for the current user.

2. The method according to claim 1 wherein the step of decomposing the ratings matrix into the product of two lower dimensionality matrices is carried out under the requirement that all the elements of both the ratings matrix and said two lower dimensionality matrices are non-negative.

3. The method according to claim 1, wherein the step of using said first plurality of evaluated hearing aid parameter settings and their association with a specific hearing aid system user to predict a new hearing aid parameter setting adapted to replace said first hearing aid parameter setting for the current user comprises the further steps of:

identifying a first plurality of specific hearing aid system users that are similar to the current user based on the similarity between evaluated hearing aid parameter settings for respectively the current user and the other specific hearing aid system users; and using the evaluated hearing aid parameter settings of the second plurality of specific hearing aid system users to predict the new hearing aid parameter setting for the current user.

4. The method according to claim 1, wherein a hearing aid parameter settings is considered to be evaluated in response to a trigger event from a group comprising:

the hearing aid parameter setting has been stored in the hearing aid system, the hearing aid parameter setting has been selected or rated in an in-situ comparison between two different hearing aid parameter settings; and the value of an internal response function for the hearing aid parameter setting has been estimated with sufficient precision.

5. The method according to claim 1, comprising the further steps of:

prompting the current user to evaluate said new hearing aid parameter setting; and providing said evaluation to said at least one server.

6. The method according to claim 1, wherein the step of providing to said at least one server a first plurality of evaluated hearing aid parameter settings each associated with a specific hearing aid system user comprises the further step of additionally associating with at least one specific hearing aid system user at least one characteristic selected from a group comprising age, gender, race, audiogram, type of hearing aid system worn, experience with wearing a hearing aid, native language and country of residence;

and wherein the step of using said first plurality of evaluated hearing aid parameter settings and their association with a specific hearing aid system user to predict a new hearing aid parameter setting is adapted to additionally use the additionally associated data.

7. The method according to claim 1, wherein the step of providing to said at least one server a first plurality of evaluated hearing aid parameter settings each associated with a specific hearing aid system user comprises the further step of additionally associating with at least one specific hearing aid system user at least one characteristic selected from a group comprising age, gender, race, audiogram, type of hearing aid system worn, experience with wearing a hearing aid, native language and country of residence;

and wherein the step of using said first plurality of evaluated hearing aid parameter settings and their association with a specific hearing aid system user to predict a new hearing aid parameter setting is adapted to additionally use the additionally associated data.

8. An in situ fitting system adapted for adjusting a hearing aid parameter setting of a hearing aid system in response to a trigger event indicating that a first hearing aid system setting is not satisfactory, wherein the adjustment of the hearing aid parameter setting is carried out through the steps of:

providing at least one server operationally connected with said hearing aid system;

providing to said at least one server a first plurality of evaluated hearing aid parameter settings each associated with a specific hearing aid system user;

using said first plurality of evaluated hearing aid parameter settings and their association with a specific hearing aid system user to predict a new hearing aid parameter setting adapted to replace said first hearing aid parameter setting for the current user, and providing the new hearing aid parameter setting to the hearing aid system and replacing said first hearing aid parameter setting with said new hearing aid parameter setting; and wherein the steps for carrying out the adjustment of the hearing aid parameter setting further comprises:

providing a ratings matrix representing said first plurality of evaluated hearing aid parameter settings each associated with a specific hearing aid system user;

decomposing the ratings matrix into the product of two lower dimensionality matrices, predicting the new hearing aid parameter setting by at least partly multiplying said two lower dimensionality matrices in order to determine a vector representing the estimated ratings of the hearing aid parameter settings, for the current user and selecting the hearing aid parameter setting with the highest estimated rating as the new hearing aid parameter setting for the current user.

9. The in situ fitting system according to claim 8 wherein the step of decomposing the ratings matrix into the product of two lower dimensionality matrices is carried out under the requirement that all the elements of both the ratings matrix and said two lower dimensionality matrices are non-negative.

10. A non-transitory computer readable medium carrying instructions which, when executed by a computer causes a method comprising the following steps to be performed:

providing at least one server operationally connected with a hearing aid system;

receiving by at least one server a first plurality of evaluated hearing aid parameter settings each associated with a specific hearing aid system user;

using said first plurality of evaluated hearing aid parameter settings and their association with a specific hearing aid system user to predict a new hearing aid parameter setting adapted to replace said first hearing aid parameter setting for the current user, and providing the new hearing aid parameter setting to the hearing aid system and replacing said first hearing aid parameter setting with said new hearing aid parameter setting;

wherein the instructions, when executed by a computer, causes the following additional steps to be performed:

providing a ratings matrix representing said first plurality of evaluated hearing aid parameter settings each associated with a specific hearing aid system user;

decomposing the ratings matrix into the product of two lower dimensionality matrices, predicting the new hearing aid parameter setting by at least partly multiplying said two lower dimensionality matrices in order to determine a vector representing the estimated ratings of the hearing aid parameter settings, for the current user and selecting the hearing aid parameter setting with the highest estimated rating as the new hearing aid parameter setting for the current user.

11. The non-transitory computer readable medium according to claim 10, wherein a software application is adapted to be downloaded from an external server and subsequently may be executed independently of the external server.

12. The non-transitory computer readable medium according to claim 10, wherein a software application is adapted to be executed at least partly from an external server and adapted to be accessed using a web browser of the computer.

13. The non-transitory computer readable medium according to claim 10 carrying instructions which, when executed by a computer causes a method comprising the following additional steps to be performed: wherein the step of decomposing the ratings matrix into the product of two lower dimensionality matrices is carried out under the requirement that all the elements of both the ratings matrix and said two lower dimensionality matrices are non- negative.

14. The non-transitory computer readable medium according to claim 13, wherein a software application is adapted to be downloaded from an external server and subsequently may be executed independently of the external server.

15. The non-transitory computer readable medium according to claim 13, wherein a software application is adapted to be executed at least partly from an external server and adapted to be accessed using a web browser of the computer.

16. The non-transitory computer readable medium according to claim 10, wherein a software application is adapted to be downloaded from an external server and subsequently may be executed independently of the external server.

17. The non-transitory computer readable medium according to claim 10, wherein a software application is adapted to be executed at least partly from an external server and adapted to be accessed using a web browser of the computer.

* * * * *